United States Patent
Chen

(10) Patent No.: US 9,705,982 B2
(45) Date of Patent: Jul. 11, 2017

(54) SYSTEM AND METHOD OF MANAGING PAIRING INFORMATION ASSOCIATED WITH PEER-TO-PEER DEVICE PAIRINGS

(71) Applicant: BlackBerry Limited, Waterloo (CA)

(72) Inventor: Shi Harry Chen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/239,504

(22) Filed: Aug. 17, 2016

(65) Prior Publication Data

US 2016/0359960 A1    Dec. 8, 2016

Related U.S. Application Data

(63) Continuation of application No. 14/607,820, filed on Jan. 28, 2015, now Pat. No. 9,438,671, which is a
(Continued)

(51) Int. Cl.
*H04L 29/08* (2006.01)
*H04B 5/00* (2006.01)
(Continued)

(52) U.S. Cl.
CPC ............. *H04L 67/104* (2013.01); *H04B 5/00* (2013.01); *H04B 5/0031* (2013.01); *H04B 7/00* (2013.01);
(Continued)

(58) Field of Classification Search
CPC ................................. H04L 67/104; H04B 5/00
See application file for complete search history.

(56) References Cited

U.S. PATENT DOCUMENTS 7,266,383 B2    9/2007 Anderson
8,112,794 B2 *  2/2012 Little ................. H04L 63/0853
                                                    380/270
(Continued)

FOREIGN PATENT DOCUMENTS

WO    2009/142375    11/2009

OTHER PUBLICATIONS

SuperTooth    Buddy—http://www.supertooth.net/AU/buddyfaq.htm#13, Retrieved Jan. 25, 20111.
(Continued)

*Primary Examiner* — Tuan H Nguyen
(74) *Attorney, Agent, or Firm* — Fish & Richardson P.C.

(57) ABSTRACT

Systems and methods of managing pairing information associated with peer-to-peer device pairings are disclosed herein. The pairing information can include link keys or other configuration data associated with the peer-to-peer device pairing. The system can detect that a first electronic device has paired with a second electronic device via a peer-to-peer device pairing connection. The first electronic device can store pairing information associated with the peer-to-peer device pairing. The system can determine when the peer-to-peer device pairing terminates. For example, the system can determine that a peer-to-peer activity has terminated, that a timeout period has elapsed, or any other event indicative of a termination of a peer-to-peer device pairing. In response to the determination that the peer-to-peer device pairing terminates, the system can delete the pairing information, thereby efficiently utilizing the storage medium of the first computing device.

20 Claims, 5 Drawing Sheets

Related U.S. Application Data continuation of application No. 13/276,078, filed on Oct. 18, 2011, now Pat. No. 8,954,003.

(51) Int. Cl.
    *H04B 7/00*      (2006.01)
    *H04W 76/02*     (2009.01)
    *H04W 8/00*      (2009.01)
    *H04W 4/00*      (2009.01)
    *H04W 12/04*     (2009.01)
    *H04W 76/06*     (2009.01)

(52) U.S. Cl.
    CPC ......... *H04L 67/1072* (2013.01); *H04W 4/008* (2013.01); *H04W 8/005* (2013.01); *H04W 12/04* (2013.01); *H04W 76/02* (2013.01); *H04W 76/028* (2013.01); *H04W 76/023* (2013.01); *H04W 76/06* (2013.01)

(56) References Cited

U.S. PATENT DOCUMENTS

| | | |
|---|---|---|
| 2006/0105712 A1 | 5/2006 | Glass et al. |
| 2006/0165060 A1 | 7/2006 | Dua |
| 2006/0183462 A1 | 8/2006 | Kolehmainen |
| 2006/0236126 A1 | 10/2006 | Adams et al. |
| 2009/0177772 A1 | 7/2009 | Guan |
| 2011/0069184 A1 | 3/2011 | Go |
| 2011/0177780 A1 | 7/2011 | Sato et al. |
| 2012/0290730 A1* | 11/2012 | Desai .................... H04L 67/104 709/228 |

OTHER PUBLICATIONS

Windows Embeded CE—managing the list of paired Devices. Http://msdn.microsoft.com/en-us/library/cc510906.aspx. Retrieved Oct. 16, 2008.

Office Action mailed Mar. 7, 2014; in corresponding Canadian patent application No. 2,792,109.

Extended European Search Report mailed Jan. 25, 2012, in corresponding application No. 11185587.0.

Communication under Rule 71(3) EPC issued in European Application No. 11185587.0 on Apr. 19, 2016.

* cited by examiner

SYSTEM AND METHOD OF MANAGING PAIRING INFORMATION ASSOCIATED WITH PEER-TO-PEER DEVICE PAIRINGS

CROSS REFERENCE TO RELATED APPLICATION

This application is a continuation of U.S. patent application Ser. No. 14/607,820, filed Jan. 28, 2015, which is a continuation of U.S. patent application Ser. No. 13/276,078, filed Oct. 18, 2011, now U.S. Pat. No. 8,954,003, the contents of which are hereby expressly incorporated by reference in their entirety for all purposes herein.

FIELD OF TECHNOLOGY

The present disclosure relates generally to peer-to-peer device pairings, and more specifically, to a system and method of managing pairing information associated with peer-to-peer device pairings.

BACKGROUND

BLUETOOTH® wireless technology provides peer-to-peer communication between BLUETOOTH® devices within a local area. Conventional BLUETOOTH® devices are adapted for use with a computing device, such as a mobile phone, portable computing devices, or a music player. BLUETOOTH® is a short-range radio link intended to replace cables connecting portable or fixed electronic devices. The BLUETOOTH® system provides a point-to-point connection or a point-to-multipoint connection. One BLUETOOTH® unit acts as the master of a piconet, whereas the other units act as slaves. In the point-to-multipoint connection, the channel is shared among several BLUETOOTH® units.

Some BLUETOOTH® connections incorporate two types of connections for a physical radio frequency (RF) link: a Synchronous Connection Oriented (SCO) links and Asynchronous Connectionless (ACL) links. The SCO link is a point-to-point link of a call connection type created between a master and a specific slave, and is used mainly for transferring voice data. One single master can have three SCO links at a maximum to the same slave or different slaves. The ACL link connects between a master in one Piconet and all the active slaves in a packet switching manner. The master can switch the packet with a given slave in a slot unit using a slot which is not reserved for the SCO link. The ACL link is mainly used for data transfer.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
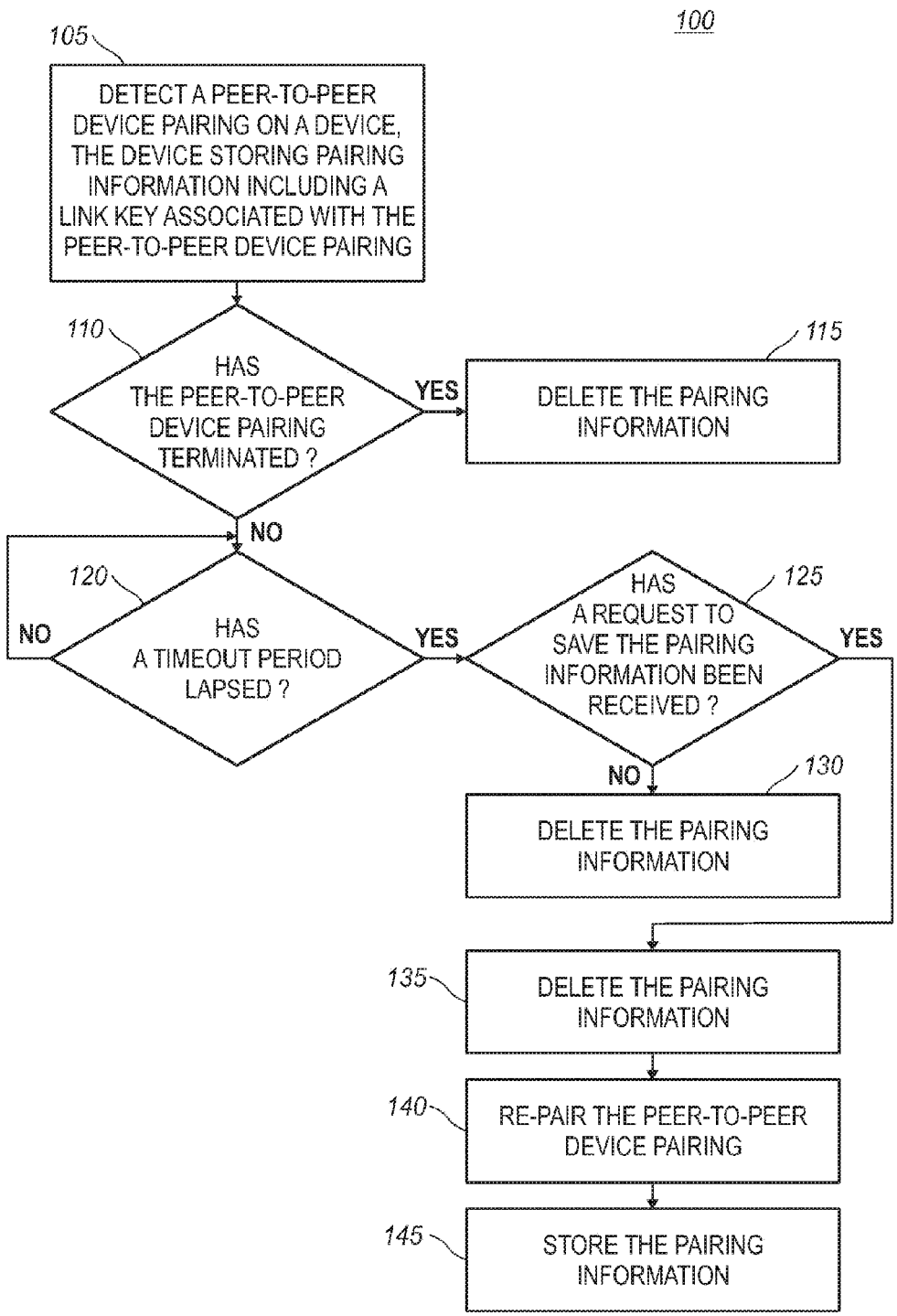
FIG. 1 is a flow chart of a method of managing pairing information associated with peer-to-peer device pairings in accordance with an exemplary embodiment of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Several definitions that apply throughout this document will now be presented. The phrase "coupled" is defined as connected, whether directly or indirectly through intervening components and is not necessarily limited to physical connections. The term "computing device" is defined as any device that is capable of at least accepting data, transmitting data, and executing commands. A computing device can include its own power source. For example, computing devices can include, but are not limited to, mobile communication devices, mobile computers, smartphones, computing pads, computing tablets, desktop computers, laptop computers, netbooks, servers, routers, set-top phones, or other computing device capable of at least accepting data, transmitting data, and executing commands.

In peer-to-peer device pairings (for example, parings between BLUETOOTH® devices, near-field communication devices, near-field-communication peer-to-peer devices, and other peer-to-peer devices), security measures are provided in the application layer and the link layer to offer secure communication. A software and/or hardware based security manager can perform these security measures.

When granting access of a second peer-to-peer device (for example, a second electronic device) to a first peer-to-peer device (for example, a first electronic device), the first peer-to-peer device (e.g., the service-providing peer-to-peer device) can create pairing information including a link key which can include at least one of the address of the first peer-to-peer device, the address of a second peer-to-peer device that wants to receive the service of the first peer-to-peer device, a Personal Identification Number (PIN), a random number, or any other configuration data which can be utilized to establish peer-to-peer device pairings. The pairing information can create a link key through a link key exchange. The peer-to-peer devices share the created link key with other devices with which they want to communicate. This process can be part of a procedure of authenticating a peer-to-peer device. During the authentication procedure, one or both of the peer-to-peer devices can create an encryption key based on the shared link key. Thereafter, the peer-to-peer devices can decrypt and encrypt data that is received and transmitted using the encryption key. The peer-to-peer devices can encrypt and decrypt all or part of the data received. For example, data transmitted via a pairing relationship can be encrypted, while data transmitted outside of the pairing relationship can remain unencrypted.

Using the link key, the second peer-to-peer device can authenticate the first peer-to-peer device, and the first peer-to-peer device can authenticate the second per-to-peer device using the encryption key. The data exchanged thereafter can be encrypted by the encryption key created through the encryption key exchange. The link key can be stored in a non-volatile memory or other storage location of one or both of the first and second peer-to-peer devices for future data exchanges therebetween.

In some instances, a user of the first peer-to-peer device may not desire to store every piece of pairing information (for example, every link key) associated with every peer-to-peer device to which the first peer-to-peer device pairs. For example, consider a situation where a user attends a conference having one hundred attendees. The user can pair his peer-to-peer device with each of the one hundred attendees to exchange contact information, business card information, resumes, brochures, presentations, data files, documents, or any other data which can be transferred by a peer-to-peer device pairing. After the user has transferred data to and received data from the attendees (e.g., completed peer-to-peer activities), the pairing information associated with each of the peer-to-peer device pairings corresponding to each of the attendees with whom the user paired his or her peer-to-peer device can remain stored on his or her device long after the user has completed the peer-to-peer activity. This stored pairing information can occupy memory or storage space on the user's peer-to-peer device which can otherwise be utilized for other data, especially on devices which are significantly storage space constrained due to cost, size, performance, weight, or other design considerations. For example, the user may only desire to maintain the pairing information of the peer-to-peer devices of a portion of the attendees with whom s/he paired and may desire to delete the pairing information of the remainder of the attendees, as the user is unlikely to transfer or receive documents from those attendees in the future. The user may also wish to delete the pairing information associated with peer-to-peer devices with whom the user is least likely to engage in future data transfers, which would in turn make the memory or storage space occupied by the pairing information available for other data. Accordingly, the present disclosure presents a system, method, and transitory computer-readable storage media of managing pairing information associated with peer to-peer device pairings.

A system configured to practice the method of managing pairing information can detect a peer-to-peer device pairing on a device. For example, the system can detect that a first electronic device has coupled (for example, paired) to a second electronic device via a peer-to-peer device pairing connection. The peer-to-peer device pairing connection can be a BLUETOOTH® connection, a near-field-communication connection (NFC), BLUETOOTH® near-field-communication, near-field-communication peer-to-peer (NFC P2P) connection, or any other peer-to-peer connection. When a peer-to-peer device pairing is established on a first electronic device, first electronic device stores pairing information associated with the peer-to-peer device pairing. For example, the first electronic device can store peer-to-peer device pairing information including a link key, a personal-identification-number (PIN), a random number, or any other configuration data associated with establishing a peer-to-peer device pairing. The system can determine a first time associated with when the peer-to-peer device pairing terminates. For example, the system can determine that a peer-to-peer activity has terminated, that a timeout period has elapsed, or any other event indicative of a termination of a peer-to-peer device pairing. In response to the determination of the first time associated with when the peer-to-peer device pairing terminates, the system can delete the pairing information. For example, the system can delete the information at a second time, which is later than the first time. As will be described in further detail below, the method of suggesting data will be described in relation to managing pairing information that includes configuration data such as a link key. Those of skill in the art will appreciate that the below-described embodiment is merely for exemplary purposes and the principles and benefits disclosed herein can be implemented in other systems manage pairing information relating to information other than configuration data.

Figure 2:
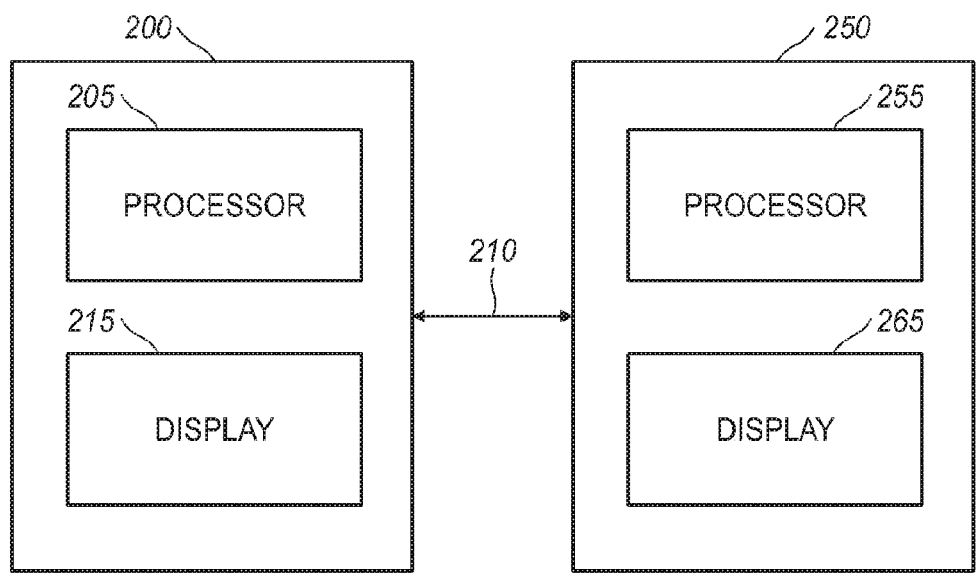
FIG. 2 is a block diagram of computing devices which can be communicatively coupled for a peer-to-peer device pairing in accordance with an exemplary embodiment of the present disclosure.

FIG. 1 is a flow chart of a non-limiting exemplary embodiment of a method of managing pairing information associated with a peer-to-peer device pairing in accordance with the present disclosure. The exemplary method 100 illustrated in FIG. 1 is provided by way of example, as there are a variety of ways to carry out the method. Additionally, while the exemplary method 100 is illustrated with a particular order of steps, those of ordinary skill in the art will appreciate that FIG. 1 is by way of example, and the steps illustrated therein can be executed in any order that accomplishes the technical advantages of the present disclosure described herein and can include fewer or more steps than as illustrated. Each block shown in FIG. 1 represents one or more processes, methods or subroutines, carried out in exemplary method 100. The steps illustrated in FIG. 1 can be implemented in a system including a first computing device coupled to a second computing device via a peer-to-peer device pairing connection, as illustrated in FIG. 2. For example, each block shown in FIG. 1 can be carried out by the processor 205 of the computing device 200 illustrated in FIG. 2. The flow chart illustrated in FIG. 1 will be described in relation to and make reference to the first computing device 200 and the second computing device 250 illustrated in FIG. 2.

In FIG. 1, the method 100 can begin at block 105. At block 105, a peer-to-peer device pairing can be detected on a device. For example, on a first computing device 200. In one exemplary embodiment, the processor 205 of the first computing device 200 can detect the peer-to-peer device pairing. For example, the processor 205 of the first computing device 200 can detect that a second computing device 250 has requested to couple with the first computing device 200, that a second computing device 250 has coupled to the first computing device 200, that a second computing device 250 has requested to receive data from the first computing device 200, that the first computing device 200 has requested to couple to a second computing device 250, that the first computing device 200 has coupled to the second computing device 250, that the first computing device 200, or any other detection that a peer-to-peer device pairing has been established on the first computing device 200. Block 105 can correspond to two mobile phones pairing via BLUETOOTH®, for example. At block 105, a detection can be made that the first computing device 200 stores pairing information associated with the peer-to-peer device pairing. For example, the first computing device 200 can store pairing information include a link key. The link key can be a shared identifier, an authentication key, a shared passkey, or any other key used to establish a coupling between the first computing device 200 and the second computing device 250. Other pairing information can include a personal identification number (PIN), a random number, an encryption key, a peer-to-peer device connection speed, user credentials, or any other configuration data associated with the peer-to-peer device pairing. After a peer-to-peer device pairing has been detected, the method can proceed to block 110.

A block 110, one or both of the peer-to-peer devices determines, at a first time, that the peer-to-peer pairing has terminated. For example, a block 110, the processor 205 of the first computing device 200 can determine whether the peer-to-peer device pairing has terminated. Block 110 can correspond to the two mobile phones going out of range of their BLUETOOTH® transmitters/receivers, or when one of the mobile phones turns off its BLUETOOTH® transmitter. In one embodiment, the processor 205 can determine that the peer-to-peer device pairing has terminated if at least one of the following is detected: a termination of a peer-to-peer (P2P) handover-triggered-action (for example, a P2P handover-triggered BLUETOOTH® action), a decoupling of the second computing device 250 from the first computing device 200 (for example, if the second computing device 250 disconnects from the first computing device 200, or vice versa), a completion of a peer-to-peer activity, or any other event indicative of a termination of peer-to-peer device pairing. The peer-to-peer activity can be a file transfer, a bandwidth-sharing activity, a telephone call, a synchronization activity, a wireless input device activity, a printing activity, a payload exchange, a purchasing activity, a transaction, or any other activity which can be carried out via a peer-to-peer device pairing. For example, at block 110, the processor 205 of the first computing device 200 can determine that the peer-to-peer device pairing has been terminated when a file transfer from the first computing device 200 to the second computing device 250 has finished. If a termination of a peer-to-peer device pairing is detected, the method can proceed to block 115.

At block 115, the pairing information 115 can be deleted. For example, the processor 205 of the first computing device 200 can delete the pairing information from the first computing device 200. Block 115 can correspond to one of the mobile phones deleting a file from local storage or removing an entry in a local database. In another embodiment, the pairing information can be deleted from the second computing device 250 or form both the first computing device 200 and the second computing device 250. The pairing information can be deleted at a second time, which is later than the first time associated with when the peer-to-peer device pairing terminates. For example, the pairing information can be deleted immediately after the detection of the peer-to-peer device pairing termination, simultaneously with the detection of the peer-to-peer device pairing termination, a predetermined time after the peer-to-peer device pairing termination (for example, a predetermined time such as half of a second, one second, five seconds, twenty seconds, forty-five seconds, two minutes, one day, or any other predetermined time), or any other time after the first time associated with the detection that the peer-to-peer device pairing is terminated. At block 115, when the pairing information is deleted, at least some of the pairing information can be deleted, and in at least one embodiment all the pairing information can be deleted. However, at block 115 at least one piece of pairing information is deleted. In another embodiment, deleting the pairing information can include clearing a history of peer-to-peer device pairings. If, however, a termination of a peer-to-peer device pairing has not been detected at block 110, the method can proceed to block 120.

At block 120 a determination can be made whether a timeout period has lapsed. For example, the processor 205 of the first computing device 200 can determine whether a period of inactivity has exceeded the timeout period. The timeout period can be a predetermined timeout period. For example, the timeout period can be a fifteen second, twenty second, one minute, five minutes, fifteen minutes, one hour, or any other predetermined period of time. In one embodiment, the processor 205 of the first computing device 200 can monitor the peer-to-peer device pairing connection. If the processor 205 determines that no peer-to-peer activity has occurred for longer than the timeout period, the processor 205 can proceed to block 125.

At block 125, a determination of whether a request to save the pairing information associated with the peer-to-peer device pairing has been received. For example, the processor 205 of the first computing device 200 can display a prompt on a first display 215 of the first computing device 200 including a first user-selectable option associated with a request to save the pairing information. The first user-selectable option can be an icon, a button, a toggle, a radio button, or any other user-selectable option which a user of the first computing device 200 can select to indicate that the user would like to save the pairing information. In another embodiment, the prompt can be displayed on the second display 265 of the second computing device 250 or both the first display 215 and the second display 265. Block 125 can correspond to one of the mobile phones receiving a command from the user, in response to a prompt, to save pairing information that is about to be deleted. If a request to save the pairing information is not received, the method 100 can proceed to block 130.

At block 130, the pairing information can be deleted. For example, the pairing information can be deleted immediately after a determination is made that a request to save the pairing information has not been received, can be deleted 0.5 seconds a determination is made that a request to save the pairing information has not been received, 0.75 seconds a determination is made that a request to save the pairing information has not been received, one second a determination is made that a request to save the pairing information has not been received, five seconds a determination is made that a request to save the pairing information has not been received, or any other short time after a determination is made that a request to save the pairing information has not been received. At block 130, when the pairing information is deleted, at least some of the pairing information can be deleted, and in at least one embodiment all the pairing information can be deleted. However, at block 130 at least one piece of pairing information is deleted. In another embodiment, deleting the pairing information can include clearing a history of peer-to-peer device pairings. If, however, a request to save the pairing information is received, the method 100 can proceed to block 135. In one aspect, the peer-to-peer device can search for pairing information to delete when available storage on the peer-to-peer device drops below a threshold. For example, if the peer-to-peer device has 200 megabytes of free space, the peer-to-peer device may not be concerned about deleting a 512 kilobyte pairing record to conserve space. However, as the free space dwindles, the peer-to-peer device can trigger the deletion of pairing information. The peer-to-peer device can delete all unnecessary pairing information or can delete fewer than all the pairing information to reach a minimum desired threshold of free storage space. The peer-to-peer device can delete pairing information automatically and/or based on explicit user instructions.

At block 135, the pairing information can be deleted. For example the pairing information can be deleted as described in relation to blocks 130 and 115. However, after the pairing information is deleted at block 130, the method 100 proceeds to block 140.

At block 140, the peer-to-peer device pairing can be re-paired. For example, the first computing device 200 and the second computing device 250 can be re-paired. When the first computing device 200 and the second computing device 250 are re-paired, the peer-to-peer device pairing can be re-established and the pairing information associated with the re-established peer-to-peer device pairing can be stored on one or both of the first computing device 200 and the second computing device 250. The pairing information associated with the re-established peer-to-peer device pairing can be the same as the previous pairing information established at block 105 or can have at least one differing piece of pairing information from the previous pairing information established at block 105. For example, if the pairing information associated with the re-established peer-to-peer device pairing is different from the previous pairing information, the pairing information associated with the re-established peer-to-peer device pairing can differ by having a different passkey from the previous pairing information, a new PIN, a new link key, an additional authentication key, or any other differing piece of pairing information. In one embodiment, re-pairing of the peer-to-peer device pairing can further include receiving a confirmation that the pairing information be saved. For example, the processor 205 of the first computing device 200 can display a second prompt one or both of the first display 215 of the first computing device and the second display 265 of the second computing device 250. The second prompt can include a second user-selectable option associated with a confirmation that the pairing information be saved. The second user-selectable option can be an icon, a button, a toggle, a radio button, or any other user-selectable option which a user of the first computing device 200 can select to indicate that the user would like to save the pairing information. For example, the second user-selectable option can be a button indicating the user desires to convert the pairing information into permanent pairing information. If a confirmation is not received, the pairing information is not stored on computing device which does not send a confirmation. If a confirmation is received, the method 100 can proceed to block 145.

At block 145, the pairing information can be stored on the computing device 200, 250. For example, the pairing information can be stored on the computing device 200, 250 which requests that the pairing information be saved, can be stored on the computing device 200, 250 which confirms that the pairing information be saved, can be stored on both the first computing device 200 and the second device 250 so long as one of the first computing device 200 and the second computing device 250 requests that the pairing information be saved, or can be stored on both the first computing device 200 and the second device 250 so long as one of the first computing device 200 and the second computing device 250 confirms that the pairing information be saved. In at least one embodiment, the pairing information can be permanently saved or stored on a computer readable medium associated with one or both of the first computing device 200 and the second computing device 250. By permanently storing the pairing information, the first computing device 200 and the second computing device 250 need not send authentication requests to each other to verify that the peer-to-peer device pairing is desired. This can thereby provide for efficient, quick, and time-saving peer-to-peer activity. In another embodiment, where the pairing information associated with the re-established peer-to-peer device pairing is the same as the previous pairing information, the pairing information can be converted into permanent pairing information. At block 145, storing the pairing information can further include establishing a permanent peer-to-peer device pairing between the first computing device 200 and the second computing device 250. By establishing a permanent peer-to-peer device pairing, the pairing information need not be established each time the first computing device 200 and the second computing device 250 couple to one another for peer-to-peer activity. Such permanent peer-to-peer device pairing can provide for efficient and quick peer-to-peer activity, such as with familiar, trusted, and/or frequently encountered devices.

While the FIG. 1 illustrates a particular order of steps, those skilled in the art will appreciate that the steps can be performed in a different order than as shown in FIG. 1. Furthermore, those of ordinary skill in the art will appreciate that fewer or more steps can be included in the method of managing pairing information illustrated in FIG. 1. For example, if a peer-to-peer device pairing is terminated at block 110, the method 100 can further include determining whether a request to save the pairing information has been received, similar to the determination made at block 125.

While the method 100 illustrated in FIG. 1 has been described as being carried out by the processor 205 of the first computing device 200, those of ordinary skill in the art will appreciate that the method 100 can be carried out by the second processor 255 of the second computing device 250, by both the processor 205 of the first computing device 200 and the second processor 255 of the second computing device 250, by a remote processor communicatively coupled to the first computing device 200 and the second computing device 250 or any other processor.

While the method 100 illustrated in FIG. 1 has been described in relation to a peer-to-peer device pairing between two computing devices, those of ordinary skill in the art will appreciate that the peer-to-peer device pairings can be between any number of computing devices, so long as there are at least two computing devices.

FIG. 2 is a block diagram of a first computing device 200 and second computing device 250 coupled via a peer-to-peer device pairing 210. In FIG. 1, the first computing device 200 and the second computing device 250 can be a smartphone, a cellphone, an electronic tablet, an electronic pad, a computer, a portable computer, a video-playback device, a DVD player, a Blu-Ray® player, a peer-to-peer-capable television (for example, a network television), a netbook, a peer-to-peer-capable audio-playback device, a peer-to-peer-capable headset, a peer-to-peer capable printer (for example, a network printer), a wireless-capable user input device (for example, a mouse, a keyboard, or other user input device) or any other computing device. The first computing device 200 and the second computing device 250 can be of the same type of computing device or can be of different types of computing devices. In FIG. 2, the first computing device 200 and the second computing device 250 are of the same type of computing device. In FIG. 2, the first computing device 200 can include a processor 205 and a display 215. The processor 205 can be directly or indirectly coupled to the first computing device 200. The processor 205 can be a processor assembly including one or more processors. The processor 205 can be a solid state processor, a core processor, or any other processor 205 configured to execute instructions for carrying out the method of managing pairing information described herein. The display 215 can be a touchscreen display, a liquid crystal display (LCD), a light emitting diode display (LED), an active matrix organic light emitting diode display (AMOLED), or any other display on which graphical information can be displayed. The second computing device 250 can have a display processor 255 and a display 265 similar to those of the first computing device 200. In FIG. 2, the first computing device 200 and the second computing device 250 coupled to one another for peer-to-peer activities via a communication interface 210. The communication interface 210 can be a peer-to-peer device pairing interface such as a BLUETOOTH® interface, an NFC interface, an NFC P2P interface, or any other peer-to-peer interface that enables the first communication device 200 and the second communication device 250 to engage in peer-to-peer activities. As described above, the method of managing pairing information associated with peer-to-peer device pairings can be carried out on one or both of the first computing device 200 and the second computing device 250.

While FIG. 2 illustrates two computing devices 200, 250, those of ordinary skill in the art will appreciate that more than two computing devices can be coupled to one another for peer-to-peer activities.

Figure 3:
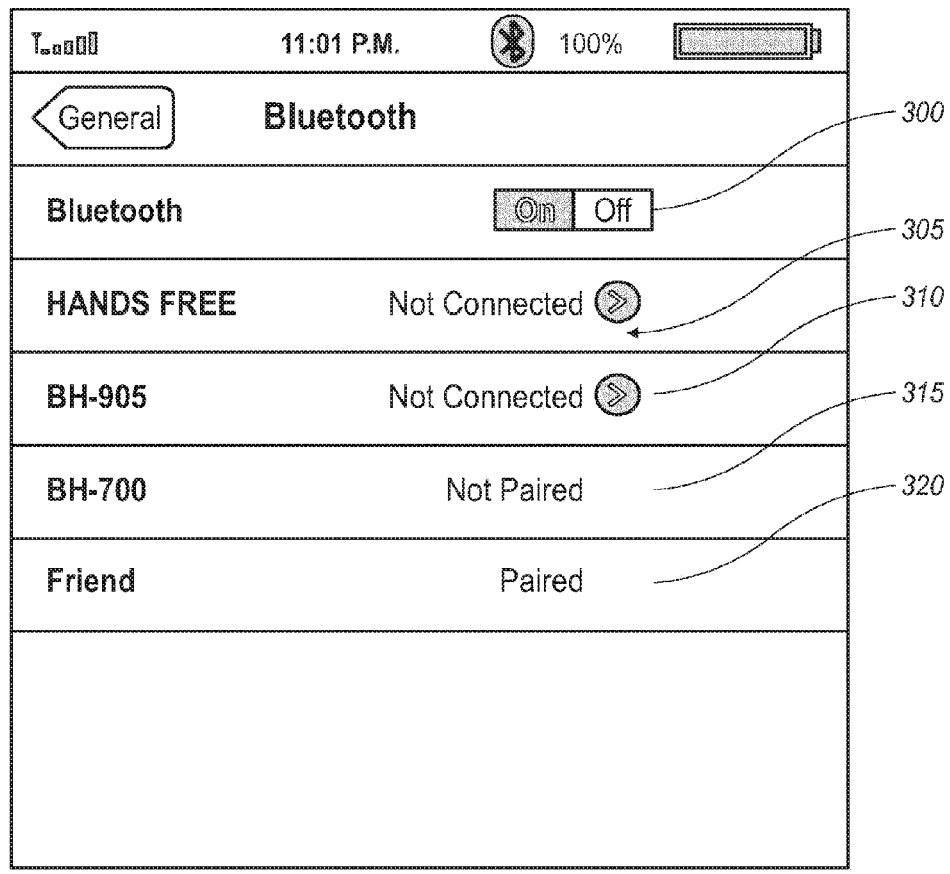
FIG. 3 is an exemplary user interface, in accordance with an exemplary embodiment of the present disclosure, illustrating peer-to-peer device pairings associated with a computing device.

FIG. 3 is an exemplary embodiment of a user interface which can be displayed on a computing device configured to peer-to-peer device pairing. For example, on a computing device 200, 250 such as those illustrated in FIG. 2. In FIG. 3, the user interface is display on the display 215 of the first computing device 200. The user interface can be a user interface for managing peer-to-peer device pairings. In FIG. 3, the user interface allows a user to manage BLUETOOTH® device pairings. As illustrated in FIG. 3, the user interface can include a toggle 300 for turning the BLUETOOTH® interface device on or off. In FIG. 3, the toggle 300 is placed in the on position. With the toggle 300 in the on position, the first computing device 200 can be enabled for peer-to-peer device parings with other peer-to-peer-capable computing devices. In FIG. 3, the user interface can include a list 305 of computing devices which are available for coupling for peer-to-peer activities. For example, the list 305 can include the names of computing devices which can couple with or pair with the first computing device 200 displaying the user interface for peer-to-peer activities. In FIG. 3, the list 305 can include permanently paired computing devices 310. The permanently paired computing device can be the computing devices with which the first computing device 200 has established a permanent peer-to-peer device pairing. In another embodiment, the permanently paired computing devices can be the computing devices with which the first computing device 200 has permanently stored at least some of the pairing information associated with the peer-to-peer device pairings between the first computing device 200 and the respective permanently paired computing device 310. In FIG. 3, the user interface lists that the permanently paired computing device 310 are "Not Connected" with the first computing device 200. Although the first computing device 200 is not connected to the permanently paired computing devices 310, the notification "Not Connected" can indicate that the first computing device 200 has established a permanent peer-to-peer device pairing with the permanently paired computing devices 310. In other embodiments, other notifications can be provided to indicate that the permanently paired computing devices 310 are associated with permanent peer-to-peer device pairings.

The user interface can include an option to toggle whether the system actively deletes pairing information. The user interface can further include settings for the sensitivity, durations, storage thresholds, usage frequency, and other settings associated with deleting pairing information.

In FIG. 3, the list 305 of the user interface can include temporarily-available computing devices 315. The temporarily-available computing devices 315 can be the computing devices which are available for peer-to-peer device pairings but have not been paired with the first computing device 200 yet and which have not been permanently paired with the first computing device 200. For example, the temporarily-available computing devices 315 can be computing devices located within a proximity from the first computing device 200, wherein the proximity is a distance sufficient to establish a peer-to-peer device pairing with the first computing device 200. The temporarily-available computing devices 315 can be selected via a user input entered at the user interface. For example, when a temporarily-available computing device 315 is selected, the first computing device 200 can establish a peer-to-peer device pairing with the temporarily-available computing device 315 and can store pairing information associated therewith to enable peer-to-peer activities. When at least one of the peer-to-peer activities with the temporarily-available computing device 310 are terminated, the temporarily available computing device 315 disconnects or decouples from the first computing device 200, or does not engage in peer-to-peer activities with the first computing device 200 within the predetermined timeout period, the processor 205 of the first computing device 200 can carry out the method of managing pairing information associated with peer-to-peer device pairings, and can delete the pairing information associated with the peer-to-peer device pairing of the temporarily available computing device 315. Deleting the pairing information associated with the peer-to-peer device pairing with the temporarily available computing device 310 can clear the memory or storage space of the first computing device 100 in which the pairing information associated with temporarily available computing device 315 was stored, thereby freeing up the memory or storage space for other data and efficiently utilizing the memory or storage space of the first computing device 200.

The list 305 of the user interface illustrated in FIG. 3 can include currently-paired computing devices 320. Currently-paired computing devices 320 can include the computing devices with which the first computing device 200 is currently paired with via a peer-to-peer device pairing. For example, the currently-paired computing devices 320 can be the computing devices with which the first computing device 200 is currently engaging in peer-to-peer activities. In FIG. 3, the currently paired computing device 320 is associated with a notification "Paired." The "Paired" notification can indicate that the associated currently-paired computing device 320 has not established a peer-to-peer device pairing with the first computing device 200. Accordingly, at the termination of the peer-to-peer device pairing with the currently-paired computing device 320, the processor 205 of the first computing device 200 can carry out the method of managing pairing information associated with peer-to-peer device pairings, and can delete the pairing information associated with the peer-to-peer device pairing of the temporarily available computing device 315. Deleting the pairing information associated with the peer-to-peer device pairing with the temporarily available computing device 310 can clear the memory or storage space of the first computing device 100 in which the pairing information associated with currently-paired computing device 320 was stored, thereby freeing up the memory or storage space for other data and efficiently utilizing the memory or storage space of the first computing device 200. In another embodiment, the currently-paired computing device 320 can be associated with a "Connected" notification. The "Connected" notification can indicate that the first computing device 200 has established a permanent peer-to-peer device pairing with the associated currently-paired computing device 320. In such an embodiment, the first computing device 200 would not delete the pairing information associated with the currently-paired computing device 320, as the permanent peer-to-peer device pairing has permanently stored the pairing information associated with the currently-paired computing device 320.

Figure 4:
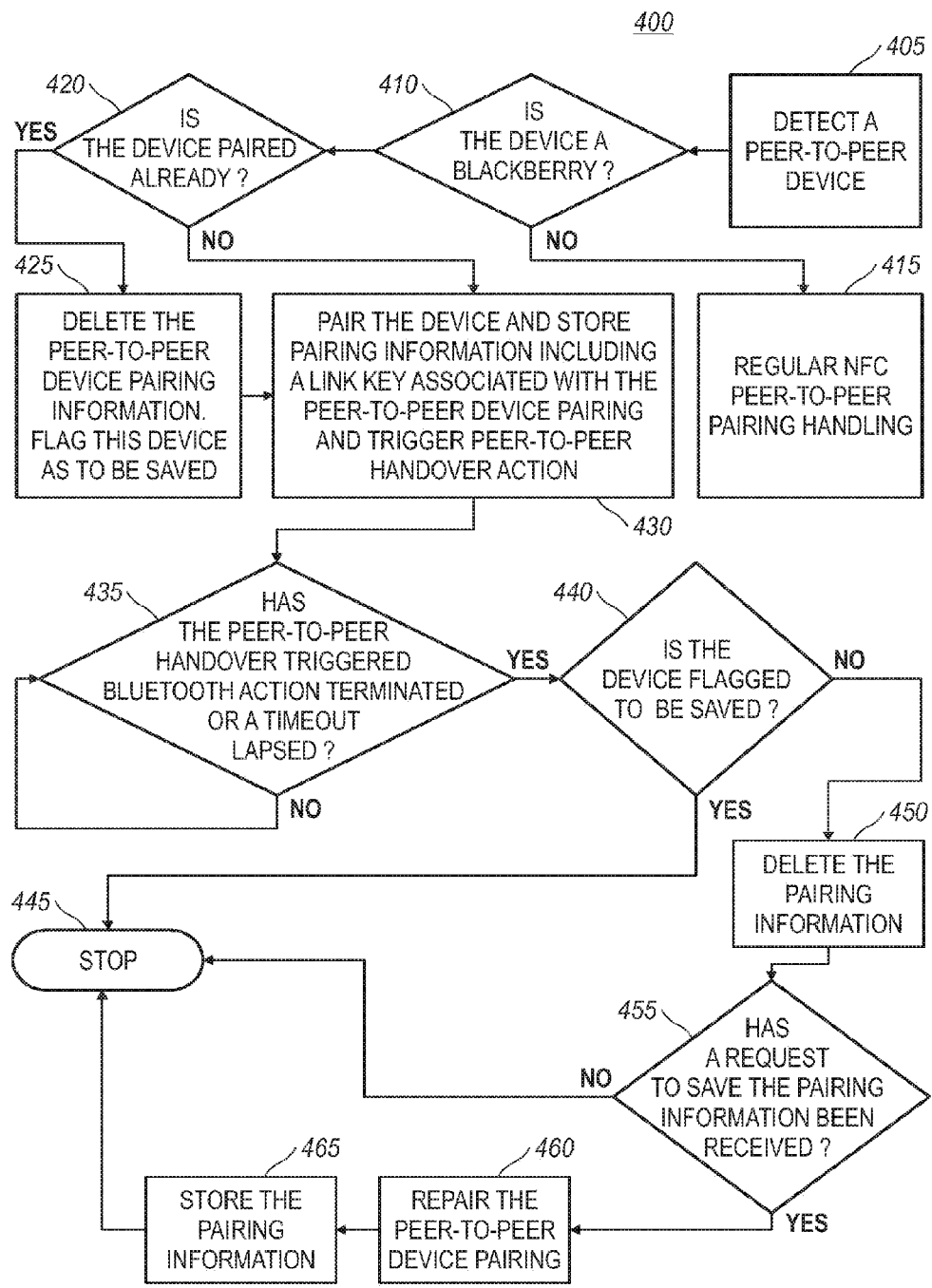
FIG. 4 is a flow chart of another embodiment of a method of managing pairing information associated with peer-to-peer device pairings, where the peer-to-peer devices can be the same type of peer-to-peer device or different types of peer-to-peer devices.

FIG. 4 is a flow chart of another non-limiting exemplary embodiment of a method of managing pairing information associated with a peer-to-peer device pairing in accordance with the present disclosure. The exemplary method 400 illustrated in FIG. 4 is provided by way of example, as there are a variety of ways to carry out the method. Additionally, while the exemplary method 400 is illustrated with a particular order of steps, those of ordinary skill in the art will appreciate that FIG. 4 is by way of example, and the steps illustrated therein can be executed in any order that accomplishes the technical advantages of the present disclosure described herein and can include fewer or more steps than as illustrated. Each block shown in FIG. 4 represents one or more processes, methods or subroutines, carried out in exemplary method 400. The steps illustrated in FIG. 4 can be implemented in a system including a first computing device coupled to a second computing device via a peer-to-peer device pairing connection, as illustrated in FIG. 2. For example, each block shown in FIG. 4 can be carried out by the processor 205 of the computing device 200 illustrated in FIG. 2. The flow chart illustrated in FIG. 4 will be described in relation to and make reference to the first computing device 200 and the second computing device 250 illustrated in FIG. 2.

In FIG. 4, the method 400 can begin at block 405. At block 405, a first peer-to-peer device (for example, first computing device 200) can detect a second peer-to-peer device (for example second computing device 250). In one exemplary embodiment, the processor 205 of the first computing device 200 can detect the peer-to-peer device pairing. For example, the processor 205 of the first computing device 200 can detect that a second computing device 250 has requested to couple with the first computing device 200, that a second computing device 250 has coupled to the first computing device 200, that a second computing device 250 has requested to receive data from the first computing device 200, that the first computing device 200 has requested to couple to a second computing device 250, that the first computing device 200 has coupled to the second computing device 250, that the first computing device 200, or any other detection that a peer-to-peer device pairing has been established on the first computing device 200. When the first peer-to-peer device (for example, a Blackberry® device) detects a second peer-to-peer device, the method can proceed to block 410.

At block 410, a determination can be made as to whether the detected second peer-to-peer device is of a same type of device as the first peer-to-peer device. For example, in the case where the first peer-to-peer device 200 is a Blackberry® device, the first peer-to-peer device 200 can determine whether the second peer-to-peer device 250 is also a Blackberry® device. The determination of whether the detected second peer-to-peer device is of a same type of device as the first peer-to-peer device can be made by the processor 205 of the first peer-to-peer device 200. In other embodiments, the processor 255 of the second peer-to-peer device 250 can transmit a notification to the first peer-to-peer device 200 indicating what type of peer-to-peer device the second peer-to-peer device 250 is. If the second peer-to-peer device 250 is not the same type of peer-to-peer device as the first peer-to-peer device 200, the method 400 can proceed to block 415.

At block 415, regular near-field-communication peer-to-peer (NFC P2P) pairing handling can be carried out. For example, the first and second peer-to-peer device can be paired by conventional NFC P2P pairing handling rather than the method of managing pairing disclosed herein. If however, at block 410, the detected second peer-to-peer device is of the same type of device as the first peer-to-peer device, the method can proceed to block 420.

At block 420, a determination can be made whether the detected second peer-to-peer device 250 has already been paired with the first peer-to-peer device 200. For example, the determination can be made by the processor 205 of the first peer-to-peer device 200, the processor 255 of the second peer-to-peer device 250. In one non-limiting example, the first peer-to-peer device 200 can determine whether the detected second peer-to-peer device 250 had previously been paired with the first peer-to-peer device 200 but the pairing information associated with the detected second peer-to-peer device 250 had not been saved by the first peer-to-peer device 200. If a determination is made that the detected second peer-to-peer device 250 has already been paired with the first peer-to-peer device 200, the method 400 can proceed to block 425. If however, a determination is made that the detected second peer-to-peer device 250 has not already been paired with the first peer-to-peer device 200, the method can proceed to block 430.

At block 425, the peer-to-peer device pairing information associated with the second peer-to-peer device 250 can be deleted and the second peer-to-peer device 250 can be flagged as to be saved. After the peer-to-peer device pairing information is deleted and the second peer-to-peer device has been flagged to be saved, the method 400 can proceed to block 430.

At block 430, the detected second peer-to-peer device 250 can be paired to the first peer-to-peer device 200. That is, a peer-to-peer device pairing can be established between the first peer-to-peer device 200 and the second peer-to-peer device 250. For example, the processor 205 of the first peer-to-peer device 200, a communication interface device coupled to one or both of the first peer-to-peer device 200 and the second peer-to-peer device 250, the processor of the second 255 peer-to-peer device 250, or any other device adapted to established peer-to-peer device pairings can establish the peer-to-peer device pairing between the first peer-to-peer device 200 and the second peer-to-peer device 250.

At block 430, the first peer-to-peer device 200 can store pairing information associated with the established peer-to-peer device pairing. For example, the first peer-to-peer device 250 can store the pairing information on a non-transitory or transitory computer-readable storage medium directly or indirectly coupled to the first peer-to-peer device. In one non-limiting example, the first peer-to-peer device 200 can store pairing information that includes a link key associated with the peer-to-peer device pairing. The link key can be a shared identifier, an authentication key, a shared passkey, or any other key used to establish a coupling between the first computing device 200 and the second computing device 250. Other pairing information can include a personal identification number (PIN), a random number, an encryption key, a peer-to-peer device connection speed, user credentials, or any other configuration data associated with the peer-to-peer device pairing. In other embodiments, the pairing information can be stored on the second peer-to-peer device 250, on both the first peer-to-peer device 200 and the second peer-to-peer device 250 or on a transitory or non-transitory computer-readable storage medium directly or indirectly coupled to one or both of the first peer-to-peer device 200 and the second peer-to-peer device.

At block 430, when the peer-to-peer device pairing is established, a peer-to-peer handover action can be triggered. For example, the peer-to-peer handover action can be a trigger to initiate peer-to-peer device activity. The peer-to-peer activity can be a file transfer, a bandwidth-sharing activity, a telephone call, a synchronization activity, a wireless input device activity, a printing activity, a payload exchange, a purchasing activity, a transaction, or any other activity which can be carried out via a peer-to-peer device pairing. Although FIG. 4 illustrates triggering a peer-to-peer handover action is triggered along with establishing the peer-to-peer device pairing and the storing of the pairing information, those of ordinary skill in the art that triggering a peer-to-peer handover action is optional. For example, the peer-to-peer device pairing can be established, and the first peer-to-peer device 200 can wait until a peer-to-peer handover action has been triggered or can waiting until a timeout period has lapsed, as described above. Referring back to FIG. 4, after the peer-to-peer device pairing has been established and the pairing information has been stored, the method 400 can proceed to block 435.

At block 435, a determination can be made whether the peer-to-peer handover-triggered action has been terminated or a timeout has elapsed. For example, the determination can be made by the processor 205 of the first peer-to-peer device 200, the processor 255 of the second peer-to-peer device 250, or both. The determination that a peer-to-peer handover-triggered action has been terminated can be a determination that a peer-to-peer activity has been terminated. For example, a terminated peer-to-peer handover-triggered action can include a termination of a file transfer, a bandwidth-sharing activity, a telephone call, a synchronization activity, a wireless input device activity, a printing activity, a payload exchange, a purchasing activity, a transaction, or any other activity which can be carried out via a peer-to-peer device pairing. For example, at block 435, the processor 205 of the first computing device 200 can determine that peer-to-peer handover-triggered action has terminated when a file transfer from the first computing device 200 to the second computing device 250 has finished. If a terminated peer-to-peer handover-triggered action is detected, the method can proceed to block 440.

Similarly, at block 435, a determination can be made that a timeout has elapsed. For example, the timeout can be a predetermined period of inactivity across the peer-to-peer device pairing. In one example, the processor 205 of the first computing device 200 can determine whether a period of inactivity has exceeded the timeout period. For example, the timeout period can be a fifteen second, twenty second, one minute, five minutes, fifteen minutes, one hour, or any other predetermined period of time. In one embodiment, the processor 205 of the first computing device 200 can monitor the peer-to-peer device pairing connection. If the processor 205 determines that no peer-to-peer activity has occurred for longer than the timeout period, the processor 205 can proceed to block 440.

If the peer-to-peer handover-triggered action has not terminated or a timeout has not elapsed, the method 400 can wait until one or both of a peer-to-peer handover-triggered action has terminated or a timeout has elapsed. Although FIG. 4 illustrates that the method 400 determines whether one of a peer-to-peer triggered action has terminated or a timeout has elapsed, those of ordinary skill in the art will appreciate that the determination at block 435 can be a determination that a peer-to-peer triggered action has terminated and a timeout has elapsed.

At block 440, a determination can be made whether the second peer-to-peer device 250 has been flagged to be saved. For example, the determination can be made by the processor 205 of the first peer-to-peer device 200, the processor 255 of the second peer-to-peer device 250, or both. If a determination is made that the second peer-to-peer device 250 has been flagged to be saved, the method can proceed to block 445, and the method 400 can stop. If however, a determination is made that the second peer-to-peer device 250 has not been flagged to be saved, the method can proceed to block 450.

At block 450, the pairing information can be deleted. For example, the processor 205 of the first peer-to-peer device 200 can execute instructions to delete the pairing information from a computer-readable storage medium of the first peer-to-peer device 200; to not permanently store the pairing information on a computer-readable storage medium of the first peer-to-peer device 200; or to purge a device pairing history, thereby deleting unsaved pairing information. In another embodiment, the processor 205 can flag the pairing information for deletion such that the pairing information is deleted at a later time. For example, when the first peer-to-peer device 200 exits a peer-to-peer device application, when a request is made to purge a device pairing history having the pairing information, when the first peer-to-peer device 200 is powered down, when the first peer-to-peer device 200 is rebooted, or any other later time when pairing information can be deleted. At block 450, when the pairing information is deleted, at least some of the pairing information can be deleted, and in at least one embodiment all the pairing information can be deleted. However, at block 450 at least one piece of pairing information is deleted. In at least one examples, the first peer-to-peer device 200 can search for pairing information to delete when available storage on the first peer-to-peer device 200 drops below a threshold. For example, if the first peer-to-peer device 200 has 200 megabytes of free space, the first peer-to-peer device 200 may not be concerned about deleting a 512 kilobyte pairing record to conserve space. However, as the free space dwindles, the first peer-to-peer device 200 can trigger the deletion of pairing information. The first peer-to-peer device 200 can delete all unnecessary pairing information or can delete fewer than all the pairing information to reach a minimum desired threshold of free storage space. The first peer-to-peer device 200 can delete pairing information automatically, based on explicit user instructions, or both automatically and based on explicit user instructions. After the pairing information has been deleted or marked for deletion, the method 400 can proceed to block 455.

At block 455, a determination can be made whether a request to save the pairing information has been received. For example, the processor 205 of the first computing device 200 can display a prompt on a first display 215 of the first computing device 200 including a first user-selectable option associated with a request to save the pairing information. In one embodiment, the prompt can be displayed approximately immediately prior to permanently deleting the pairing information from the first peer-to-peer device 200. The first user-selectable option can be an icon, a button, a toggle, a radio button, or any other user-selectable option which a user of the first computing device 200 can select to indicate that the user would like to save the pairing information. In another embodiment, the prompt can be displayed on the second display 265 of the second computing device 250 or both the first display 215 and the second display 265. Block 455 can correspond to one of the peer-to-peer devices 200, 250 receiving a command from the user, in response to a prompt, to save pairing information that is flagged for deletion. If a request to save the pairing information is not received, the method 400 can proceed to block 460.

At block 460, the peer-to-peer device pairing can be re-paired. For example, the peer-to-peer device pairing between the first peer-to-peer device 200 and the second peer-to-peer device 250 can be re-paired. When the first peer-to-peer device 200 and the second peer-to-peer device 250 are re-paired, the peer-to-peer device pairing can be re-established and the pairing information associated with the re-established peer-to-peer device pairing can be stored on one or both of the first peer-to-peer device 200 and the second peer-to-peer device 250. The pairing information associated with the re-established peer-to-peer device pairing can be the same as the previous pairing information established at block 105 or can have at least one differing piece of pairing information from the previous pairing information established at block 430. For example, if the pairing information associated with the re-established peer-to-peer device pairing is different from the previous pairing information, the pairing information associated with the re-established peer-to-peer device pairing can differ by having a different passkey from the previous pairing information, a new PIN, a new link key, an additional authentication key, or any other differing piece of pairing information. In one embodiment, re-pairing of the peer-to-peer device pairing can further include receiving a confirmation that the pairing information be saved. For example, the processor 205 of the first peer-to-peer device 200 can display a second prompt one or both of the first display 215 of the first peer-to-peer device and the second display 265 of the second peer-to-peer device 250. The second prompt can include a second user-selectable option associated with a confirmation that the pairing information be saved. The second user-selectable option can be an icon, a button, a toggle, a radio button, or any other user-selectable option which a user of the first peer-to-peer device 200 can select to indicate that the user would like to save the pairing information. For example, the second user-selectable option can be a button indicating the user desires to convert the pairing information into permanent pairing information. If a confirmation is not received, the pairing information is not stored on computing device which does not send a confirmation. If a confirmation is received, the method 400 can proceed to block 465.

At block 465, the pairing information can be stored on one or both of the peer-to-peer device 200 and the second peer-to-peer device 250. For example, the pairing information can be stored on the peer-to-peer 200, 250 which requests that the pairing information be saved, can be stored on the peer-to-peer device 200, 250 which confirms that the pairing information be saved, can be stored on both the first peer-to-peer device 200 and the second peer-to-peer device 250 so long as one of the first peer-to-peer device 200 and the second peer-to-peer device 250 requests that the pairing information be saved, or can be stored on both the first peer-to-peer device 200 and the second peer-to-peer device 250 so long as one of the first peer-to-peer device 200 and the second peer-to-peer device 250 confirms that the pairing information be saved. In at least one embodiment, the pairing information can be permanently saved or stored on a computer readable medium associated with one or both of the first peer-to-peer device 200 and the second peer-to-peer device 250. By permanently storing the pairing information, the first peer-to-peer device 200 and the second peer-to-peer device 250 need not send authentication requests to each other to verify that the peer-to-peer device pairing is desired. This can thereby provide for efficient, quick, and time-saving peer-to-peer activity. In another embodiment, where the pairing information associated with the re-established peer-to-peer device pairing is the same as the previous pairing information, the pairing information can be converted into permanent pairing information. At block 465, storing the pairing information can further include establishing a permanent peer-to-peer device pairing between the first peer-to-peer device 200 and the second peer-to-peer device 250. By establishing a permanent peer-to-peer device pairing, the pairing information need not be established each time the first peer-to-peer device 200 and the second peer-to-peer device 250 couple to one another for peer-to-peer activity. Such permanent peer-to-peer device pairing can provide for efficient and quick peer-to-peer activity, such as with familiar, trusted, and/or frequently encountered devices. After the pairing information is stored, the method can proceed to block 445, and the method 400 can stop.

While the FIG. 4 illustrates a particular order of steps, those skilled in the art will appreciate that the steps can be performed in a different order than as shown in FIG. 1. Furthermore, those of ordinary skill in the art will appreciate that fewer or more steps can be included in the method of managing pairing information illustrated in FIG. 4.

While the method 400 illustrated in FIG. 4 has been described as being carried out by the processor 205 of the first peer-to-peer device 200, those of ordinary skill in the art will appreciate that the method 100 can be carried out by the second processor 255 of the second peer-to-peer device 250, by both the processor 205 of the first peer-to-peer device 200 and the second processor 255 of the second peer-to-peer device 250, by a remote processor communicatively coupled to the first peer-to-peer device 200 and the second peer-to-peer device 250 or any other processor.

Figure 5:
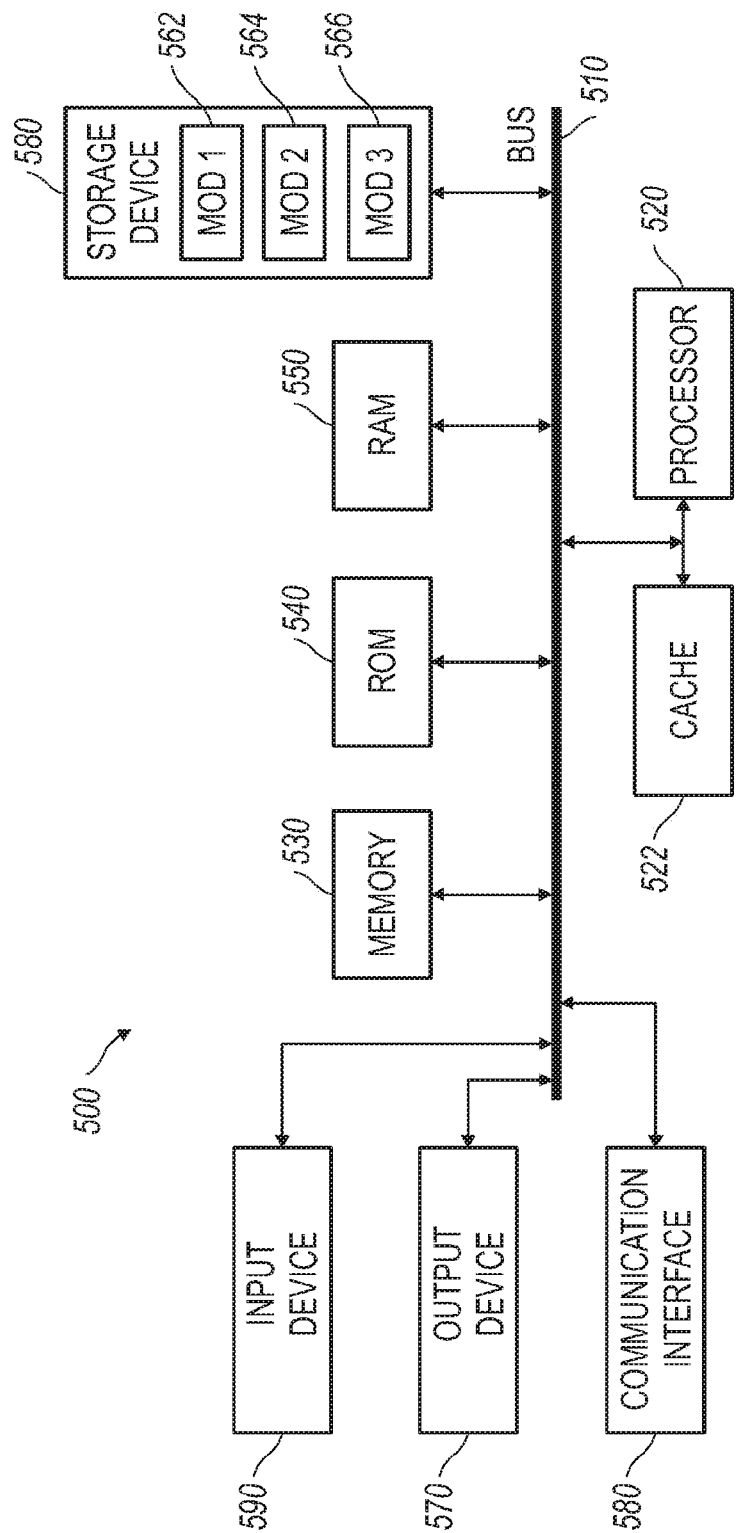
FIG. 5 illustrates an exemplary computing device system embodiment.

While the method 400 illustrated in FIG. 4 has been described in relation to a peer-to-peer device pairing between two computing devices, those of ordinary skill in the art will appreciate that the peer-to-peer device pairings can be between any number of computing devices, so long as there are at least two computing devices The disclosure now turns to a brief description of a basic general purpose system or computing device, as shown in FIG. 5, which can be employed to practice the concepts is disclosed herein. The components disclosed herein can be incorporated in whole or in part into handsets, transmitters, servers, and/or any other electronic or other computing device.

With reference to FIG. 5, an exemplary system 500 includes a general-purpose computing device 500, including a processing unit (CPU or processor) 520 and a system bus 510 that couples various system components including the system memory 530 such as read only memory (ROM) 540 and random access memory (RAM) 550 to the processor 520. The system 500 can include a cache 522 of high speed memory connected directly with, in close proximity to, or integrated as part of the processor 520. The system 500 copies data from the memory 530 and/or the storage device 560 to the cache 522 for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 4 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output system (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer readable storage media provide nonvolatile storage of computer readable instructions, data structures, program modules and other data for the computing device 500. In one aspect, a hardware module that performs a particular function includes the software component stored in a non-transitory computer-readable medium in connection with the necessary hardware components, such as the processor 520, bus 510, display 570, and so forth, to carry out the function. The basic components are known to those of skill in the art and appropriate variations are contemplated depending on the type of device, such as whether the device 500 is a small, handheld computing device, a desktop computer, or a computer server.

Although the exemplary embodiment described herein employs the hard disk 560, it should be appreciated by those skilled in the art that other types of computer readable media which can store data that are accessible by a computer, such as magnetic cassettes, flash memory cards, digital versatile disks, cartridges, random access memories (RAMs) 550, read only memory (ROM) 540, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 520. The functions these blocks represent may be provided through the use of either shared or dedicated hardware, including, but not limited to, hardware capable of executing software and hardware, such as a processor 520, that is purpose-built to operate as an equivalent to software executing on a general purpose processor. For example the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 540 for storing software performing the operations discussed below, and random access memory (RAM) 550 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 500 shown in FIG. 5 can practice all or part of the recited methods, can be a part of the recited systems, and/or can operate according to instructions in the recited non-transitory computer-readable storage media. Such logical operations can be implemented as modules configured to control the processor 520 to perform particular functions according to the programming of the module. For example, FIG. 5 illustrates three modules Mod 1 562, Mod 2 564 and Mod 3 566 which are modules configured to control the processor 520. These modules may be stored on the storage device 560 and loaded into RAM 550 or memory 530 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors. etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply not only to a smartphone device but to other devices capable of receiving communications such as a laptop computer. Those skilled in the art will readily recognize various modifications and changes that may be made to the principles described herein without following the example embodiments and applications illustrated and described herein, and without departing from the spirit and scope of the disclosure.

What is claimed is:

1. A method comprising:
   establishing a peer-to-peer device pairing between a first peer-to-peer device and a second peer-to-peer device;
   storing, at the first peer-to-peer device, pair information associated with the peer-to-peer device pairing;
   determining that the peer-to-peer device pairing terminates; and
   in response to determining that the peer-to-peer device pairing terminates:
      determining, at a first peer-to-peer device, that the second peer-to-peer device is not flagged to be saved; and
      in response to determining that the second peer-to-peer device is not flagged to be saved:
         deleting the pairing information;
         prompting whether to save pairing information; and
         repairing the peer-to-peer device pair in response to receiving a user-selection to save the pairing information.

2. The method of claim 1, wherein the peer-to-peer device pairing is at least one of a BLUETOOTH® device pairing, a near-field communication device pairing, or a near-field communication-peer-to-peer device pairing.

3. The method of claim 1, wherein determining that the peer-to-peer device pairing terminates comprises detecting a completion of a peer-to-peer activity.

4. The method of claim 3, wherein the peer-to-peer activity includes at least one of a file transfer, a bandwidth sharing activity, a telephone call, a synchronization activity, a wireless input device activity, or a printing activity.

5. The method of claim 1, wherein determining that the peer-to-peer device pairing terminates comprises detecting a decoupling of a peer-to-peer device.

6. The method of claim 1, wherein determining that the peer-to-peer device pairing terminates comprises detecting a period of inactivity exceeding a predetermined timeout period.

7. The method of claim 1, further comprising: storing new pairing information for the peer-to-peer device pairing after the peer-to-peer device pair is repaired.

8. A peer-to-peer device, comprising:
   a memory; and
   at least one hardware processor communicatively coupled with the memory and configured to:
      establish a peer-to-peer device pairing between the peer-to-peer device and a different peer-to-peer device;
      store, at the peer-to-peer device, pair information associated with the peer-to-peer device pairing;
      determining that the peer-to-peer device pairing terminates; and
      in response to determining that the peer-to-peer device pairing terminates:
         determining, at the peer-to-peer device, that the different peer-to-peer device is not flagged to be saved; and
         in response to determining that the different peer-to-peer device is not flagged to be saved:
         deleting the pairing information;
         prompting whether to save pairing information; and
         repairing the peer-to-peer device pair in response to receiving a user-selection to save the pairing information.

9. The peer-to-peer device of claim 8, wherein the peer-to-peer device pairing is at least one of a BLUETOOTH® device pairing, a near-field communication device pairing, or a near-field communication-peer-to-peer device pairing.

10. The peer-to-peer device of claim 8, wherein determining that the peer-to-peer device pairing terminates comprises detecting a completion of a peer-to-peer activity.

11. The peer-to-peer device of claim 10, wherein the peer-to-peer activity includes at least one of a file transfer, a bandwidth sharing activity, a telephone call, a synchronization activity, a wireless input device activity, or a printing activity.

12. The peer-to-peer device of claim 8, wherein determining that the peer-to-peer device pairing terminates comprises detecting a decoupling of a peer-to-peer device.

13. The peer-to-peer device of claim 8, wherein determining that the peer-to-peer device pairing terminates comprises detecting a period of inactivity exceeding a predetermined timeout period.

14. The peer-to-peer device of claim 8, wherein the at least one hardware processor is configured to: store new pairing information for the peer-to-peer device pairing after the peer-to-peer device pair is repaired.

15. A non-transitory computer-readable medium containing instructions which, when executed, cause a mobile device to perform operations comprising:
  establishing a peer-to-peer device pairing between a first peer-to-peer device and a second peer-to-peer device;
  storing, at the first peer-to-peer device, pair information associated with the peer-to-peer device pairing;
  determining that the peer-to-peer device pairing terminates; and
  in response to determining that the peer-to-peer device pairing terminates:
    determining, at a first peer-to-peer device, that the second peer-to-peer device is not flagged to be saved; and
    in response to determining that the second peer-to-peer device is not flagged to be saved:
    deleting the pairing information;
    prompting whether to save pairing information; and
    repairing the peer-to-peer device pair in response to receiving a user-selection to save the pairing information.

16. The computer-readable medium of claim 15, wherein the peer-to-peer device pairing is at least one of a BLUETOOTH® device pairing, a near-field communication device pairing, or a near-field communication-peer-to-peer device pairing.

17. The computer-readable medium of claim 15, wherein determining that the peer-to-peer device pairing terminates comprises detecting a completion of a peer-to-peer activity.

18. The computer-readable medium of claim 17, wherein the peer-to-peer activity includes at least one of a file transfer, a bandwidth sharing activity, a telephone call, a synchronization activity, a wireless input device activity, or a printing activity.

19. The computer-readable medium of claim 15, wherein determining that the peer-to-peer device pairing terminates comprises detecting a decoupling of a peer-to-peer device.

20. The computer-readable medium of claim 15, wherein determining that the peer-to-peer device pairing terminates comprises detecting a period of inactivity exceeding a predetermined timeout period.

* * * * *